United States Patent
Cho et al.

(10) Patent No.: US 9,197,887 B2
(45) Date of Patent: Nov. 24, 2015

(54) GEOMETRIC CORRECTION APPARATUS AND METHOD BASED ON RECURSIVE BEZIER PATCH SUB-DIVISION CROSS-REFERENCE TO RELATED APPLICATION

(71) Applicants: Electronics and Telecommunications Research Institute, Daejeon (KR); National University of Sciences & Technology, Islamabad (PK)

(72) Inventors: Yong Ju Cho, Seoul (KR); Ji Hun Cha, Daejeon (KR); Myung Seok Ki, Daejeon (KR); Seong Yong Lim, Daejeon (KR); Yong Ju Lee, Daejeon (KR); Seung Kwon Beack, Seoul (KR); Jin Woong Kim, Daejeon (KR); Rehan Hafiz, Islamabad (PK); Muhammad Murtaza Khan, Islamabad (PK); Atif Ahmed, Islamabad (PK); Arshad Ali, Islamabad (PK)

(73) Assignees: Electronics and Telecommunications Research Institute, Daejeon (KR); National University of Sciences & Technology, Islamabad (PK)

( * ) Notice: Subject to any disclaimer, the term of this patent is extended or adjusted under 35 U.S.C. 154(b) by 442 days.

(21) Appl. No.: 13/678,315

(22) Filed: Nov. 15, 2012

(65) Prior Publication Data

US 2013/0128057 A1    May 23, 2013

(30) Foreign Application Priority Data

Nov. 17, 2011 (KR) .......................... 10-2011-0120519

(51) Int. Cl.
*H04N 9/31* (2006.01)
*H04N 17/04* (2006.01)

(52) U.S. Cl.
CPC ............. *H04N 17/04* (2013.01); *H04N 9/3185* (2013.01); *H04N 9/3194* (2013.01)

(58) Field of Classification Search
CPC .. H04N 9/3185; H04N 9/3194; H04N 9/3182
USPC ...................................................... 353/69, 70
See application file for complete search history.

(56) References Cited

U.S. PATENT DOCUMENTS 6,219,099 B1 *  4/2001  Johnson et al. ............... 348/383
6,310,650 B1 * 10/2001  Johnson et al. ............... 348/383
(Continued)

FOREIGN PATENT DOCUMENTS

JP       2005151418 A      6/2005
WO  WO 2011051281 A1 *   5/2011

OTHER PUBLICATIONS

Ezekiel S. Bhasker, Geometric Modeling and Calibration of Planar Multi-Projector Displays Using Rational Bezier Patches, Computer Vision and Pattern Recognition, 2007. CVPR IEEE Conference.

(Continued)

*Primary Examiner* — Bao-Luan Le
(74) *Attorney, Agent, or Firm* — William Park & Associates Ltd.

(57) ABSTRACT

Provided is a geometric correction apparatus and method based on a recursive Bezier patch sub-division. A geometric correction method may include: receiving, from a camera, a first image that is obtained by photographing a black screen that is projected by a projector onto a projection surface; receiving, from the camera, a second image that is obtained by photographing a predetermined pattern that is projected by the projector onto the projection screen; generating a third image by subtracting the first image from the second image; and performing geometric correction with respect to the predetermined pattern to correct a distortion between the predetermined pattern and the third image.

12 Claims, 9 Drawing Sheets

(56) References Cited

U.S. PATENT DOCUMENTS

| | | |
|---|---|---|
| 6,804,406 B1 * | 10/2004 | Chen .............................. 382/254 |
| 8,870,386 B2 * | 10/2014 | Kasuya et al. .................. 353/69 |
| 2004/0155965 A1 | 8/2004 | Jaynes et al. |
| 2004/0184013 A1 | 9/2004 | Raskar et al. |
| 2011/0032381 A1 * | 2/2011 | Nara .......................... 348/229.1 |
| 2012/0098937 A1 * | 4/2012 | Sajadi et al. .................... 348/46 |
| 2012/0127323 A1 * | 5/2012 | Kasuya et al. ................. 348/189 |
| 2012/0212627 A1 * | 8/2012 | Klose ............................ 348/189 |

OTHER PUBLICATIONS

Soon-Yong Park, Active Calibration of Camera-Projector Systems based on Planar Nomography, 2010 International Conference on Pattern Recognition. pp. 320-323.

* cited by examiner

GEOMETRIC CORRECTION APPARATUS AND METHOD BASED ON RECURSIVE BEZIER PATCH SUB-DIVISION

CROSS-REFERENCE TO RELATED APPLICATION

This application claims the priority benefit of Korean Patent Application No. 10-2011-0120519, filed on Nov. 17, 2011, in the Korean Intellectual Property Office, the disclosure of which is incorporated herein by reference.

BACKGROUND

1. Field of the Invention

Embodiments of the present invention relate to a geometric correction apparatus and method, more particularly, to a geometric correction apparatus and method based on recursive Bezier patch sub-division.

2. Description of the Related Art

Currently, with emergency of projection technology, immersive projection environments have been provided. An immersive display may be future technology about high definition media contents technology.

A wide angle of view and high resolution contents aim to provide immersive experience by making it possible for a user to feel as if the user "is there". Meanwhile, a wide and even surface, such as a large screen of a theater, may provide an excellent immersive experience, whereas a high order surface such as a curved screen, a dome-shaped screen, and the like, may create a virtual visual environment around a user and thus, may provide a further powerful immersive experience.

Figure 1:
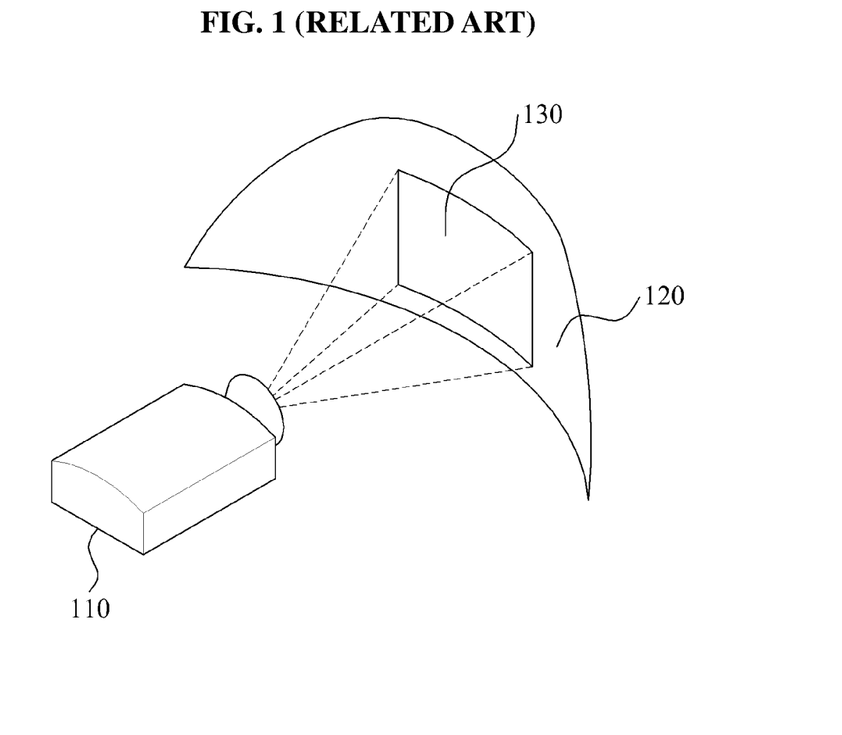
FIG. 1 illustrates a projector projecting media content onto an uneven projection surface.

For example, to provide a further powerful immersive experience to a user, an uneven projection surface 120 of FIG. 1 may be provided. For example, a projector 110 may project media content onto the uneven and curved projection surface 120. In this case, since the projection surface 120 is uneven, an image 130 projected onto the projection surface 120 may be displayed to be different from an original image. That is, the image 130 projected onto the projection surface 120 may be distorted.

Accordingly, there is a desire for geometric correction technology that enables content projected onto an uneven projection surface to be displayed without being distorted.

SUMMARY

According to an aspect of the present invention, there is provided a geometric correction method, including: receiving, from a camera, a first image that is obtained by photographing a black screen that is projected by a projector onto a projection surface; receiving, from the camera, a second image that is obtained by photographing a predetermined pattern that is projected by the projector onto the projection screen; generating a third image by subtracting the first image from the second image; and performing geometric correction with respect to the predetermined pattern to correct a distortion between the predetermined pattern and the third image.

The performing of the geometric correction may include: extracting a feature point from the third image; moving the extracted feature point from a domain of the third image photographed using the camera to a domain of the predetermined pattern projected using the projector; applying Bezier transformation with respect to the third image based on the moved feature point; and performing the geometric correction by recursively applying the Bezier transformation.

According to another aspect of the present invention, there is provided a geometric correction apparatus, including: a receiver to receive, from a camera, a first image that is obtained by photographing a black screen that is projected by a projector onto a projection surface, and to receive, from the camera, a second image that is obtained by photographing a predetermined pattern that is projected by the projector onto the projection screen; a generator to generate a third image in which an undesired artifact is removed by a subtracting the first image from the second image; and a processing unit to perform geometric correction with respect to the predetermined pattern to correct a distortion between the predetermined pattern and the third image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A geometric correction method according to an embodiment of the present invention may perform geometric correction with respect to an uneven quadric projection surface using recursive Bezier patch sub-division.

A Bezier patch will be described prior to describing the geometric correction method according to an embodiment of the present invention.

A Bezier surface may be a type of polynomial surface using Bernstein polynomials to generate a two-dimensional (2D) surface using a separate control point. Here, a position of each control point may be used to determine a shape and a curvature of the Bezier surface.

A complete rectangular surface may be a second degree Bezier surface including nine control points. The nine control points may include four corner control points, four edge control points, and a single center control point. Here, when one of the control points is moved from an initial position, the surface may be correspondingly transformed. Also, a surface point close to a control point may be subject to a further intensive force.

The second degree Bezier surface on the plane (u, v) of (n, m) order may include two independent parametric curves B(u) and B(v) that are orthogonal to each other, and may be defined as a control point of (n+1)(m+1).

Each Bezier parameter value may be determined to be between 0 and 1, and may be expressed by Equation 1:

$$B(u, v) = \sum_{i=0}^{n} B_n^i(u) \times \sum_{j=0}^{m} B_m^j(v) \times k_{ij} \begin{cases} 0 \leq u \leq 1 \\ 0 \leq v \leq 1 \end{cases}$$

In Equation 1, $$B_n^i(u) = \binom{n}{i} u^i (1-u)^{n-i},$$

$$B_m^j(v) = \binom{m}{j} v^j (1-v)^{m-j},$$

and $B_n^i(u)$ and $B_m^j(v)$ denote Bezier curves on u parametric axis and v parametric axis, respectively, and $k_{ij}$ denotes a set of control points.

A geometric correction apparatus and method according to an embodiment of the present invention may utilize the following three characteristics of the Bezier surface, including (1) characteristic that the Bezier surface is positioned within a convex hull of control points, (2) characteristic that a Bezier surface point positioned at a corner refers to a point positioned right below a corresponding control point, and (3) characteristic that when any one parametric axis has a constant value, a Bezier curve is obtainable. Accordingly, an edge of the Bezier curve may have a Bezier curve in which any one parametric axis has a value of "0" or "1". However, (2) characteristic is not applied to other control points except for a control point positioned at a corner.

Figure 2A:
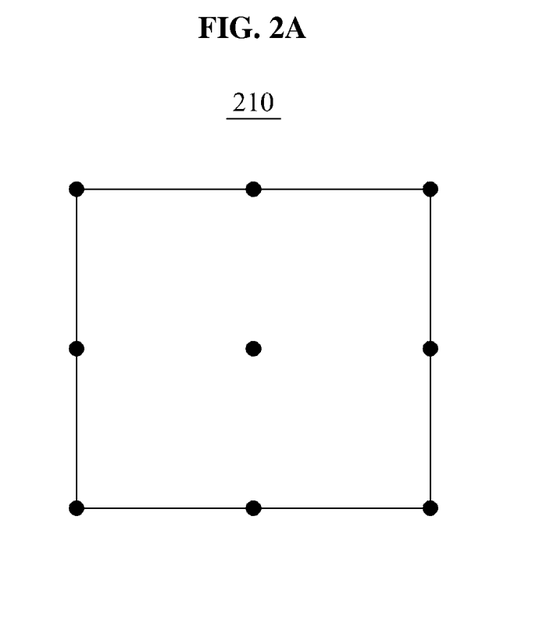
FIGS. 2A and 2B are diagrams illustrating a rectangular surface including nine data to points.
Figure 2B:
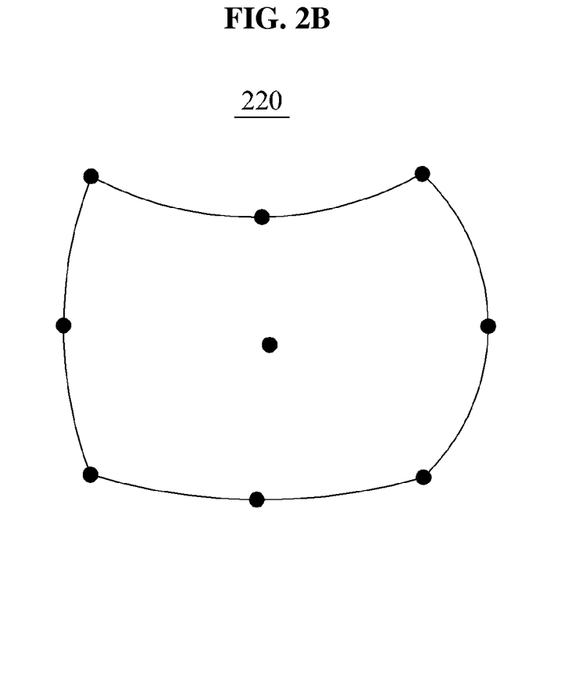

FIGS. 2A and 2B are diagrams illustrating a rectangular surface including nine data points.

Referring to FIG. 2A, a rectangular grid 210 may include nine data points. The nine data points may include four corner data points, four edge data points, and a single center data point. When the rectangular grid 210 is distorted by second order transformation, the rectangular grid 210 may be transformed to be a distorted rectangular surface 220.

Meanwhile, in a state where a set of data points is given on the quadric surface, a second order Bezier surface may be mapped on data points on the quadric surface by estimating positions of control points. For example, a rectangle 310 of FIG. 3A may express a second order Bezier surface, and a distorted rectangle 320 may express a transformed rectangle by moving a control point on the second order Bezier surface.

Positions of control points may be estimated according to Equation 2:

$$P_1 = \frac{B(t) - (1-t)^2 P_0 - t^2 P_2}{2(1-t)(t)} \qquad [\text{Equation 2}]$$

Figure 3A:
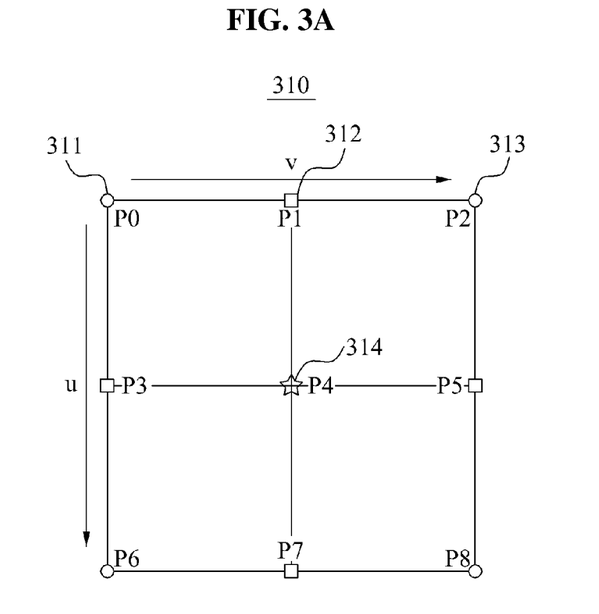
FIGS. 3A and 3B, and FIGS. 4A and 4B are diagrams illustrating a Bezier patch according to an embodiment of the present invention.
Figure 3B:
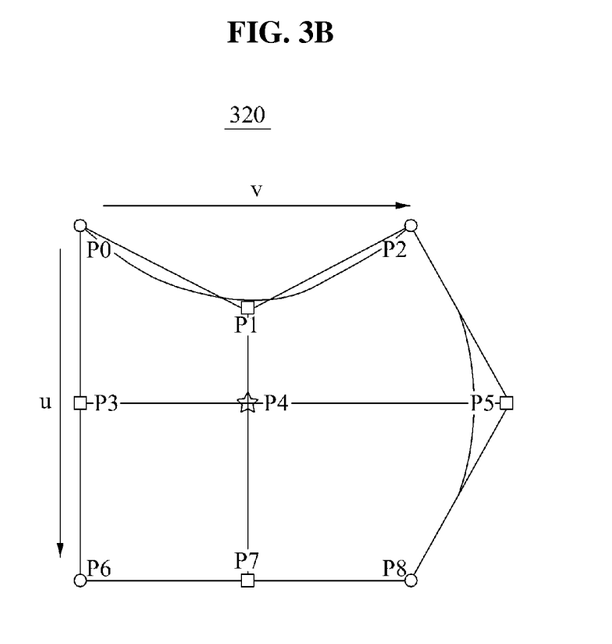

Here, t denotes a Bezier parameter, and (B) denotes a known position of a data point on the surface. Referring to FIG. 3A, corner points P0 311, P2 313, P6, and P8 match four corner data points.

Meanwhile, an edge control point P1 312 is positioned between P0 311 and P2 313. Therefore, in Equation 2, t may become 0.5, and B(t) may become a position of an edge data point corresponding to P1 312.

Similarly, a position of an edge control point of each of P3, P5, and P7 may be computed using each corresponding data point.

Also, a face control point of P4 314 may be estimated by repeatedly adjusting a center pixel of the estimated Bezier surface to match a center of an image.

In the case of a surface having polynomial distortion, a relatively further large number of control points may be used for mapping and compensation of the surface. However, the above operation may increase the mathematical complexity and thus, an amount of operation time may increase. However, a geometric correction method according to an embodiment of the present invention may achieve surface mapping of a level similar to a high dimension without using the high dimension.

That is, a geometric correction method according to an embodiment of the present invention may start from the smooth surface using sparse initial known points. To obtain the high accuracy of a surface mesh, it is possible to recursively estimate a density of the quadric surface.

Figure 4A:
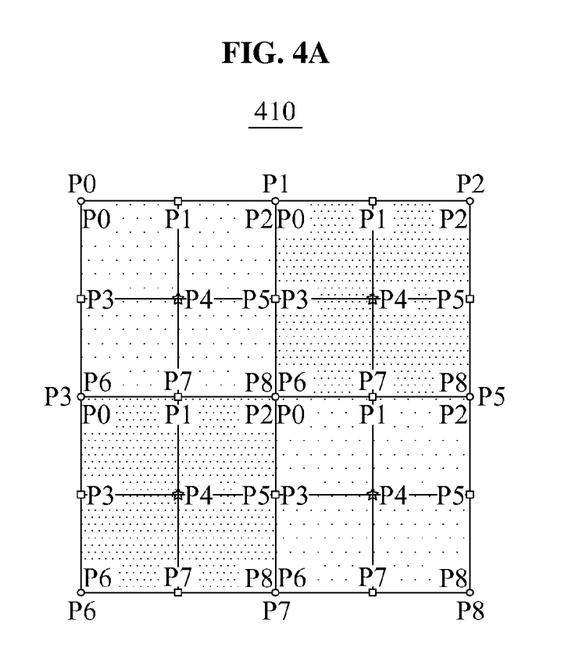
Figure 4B:
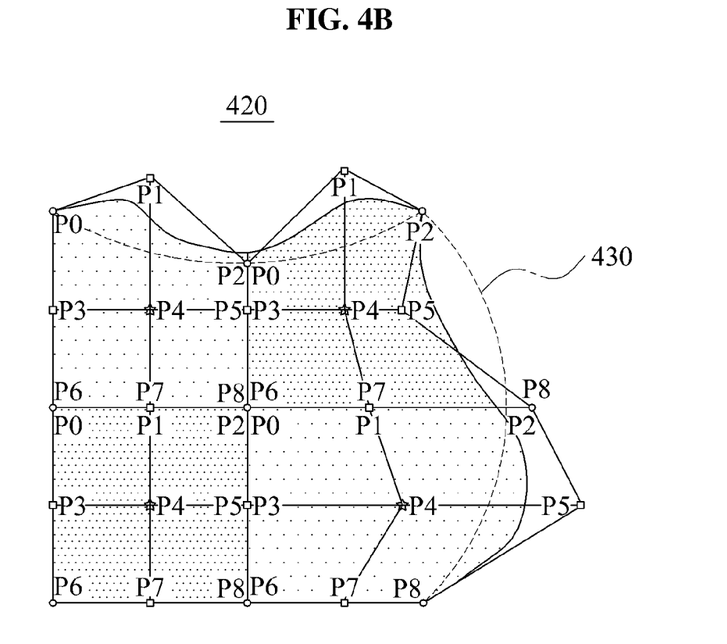

More specifically, all the Bezier patches may be defined using the second degree Bezier surface having nine control points. A first level sub-division may be performed by subdividing each of four Bezier patches into four sub-patches or quadrants with respect to the second degree Bezier surface. Here, each of the four sub-patches may include nine controls points, for example, four corner control points, four edge control points, and a single center control point. Referring to FIG. 4A, a rectangle 410 indicates a Bezier patch in a first level sub-division state. As shown in a distorted rectangle 420 of FIG. 4, in the case of a higher level sub-division, it is possible to provide a high control. A dotted line 430 indicated in FIG. 4B shows a transformation in a zero-th level sub-division. Compared to an outlier of the distorted rectangle 420, a relatively low control is provided.

Similar to the aforementioned operation, a second level sub-division may generate 16 Bezier surface patches by subdividing the respective Bezier patches of the first level sub-division e into four sub-patches again.

Here, a control point positioned in a boundary between two sub-patches may operate as a common control point that is commonly applied to two sub-patches. Accordingly, an edge control point of an i-th level sub-division may be a corner control point in an (i+1)-th level sub-division.

Figure 5A:
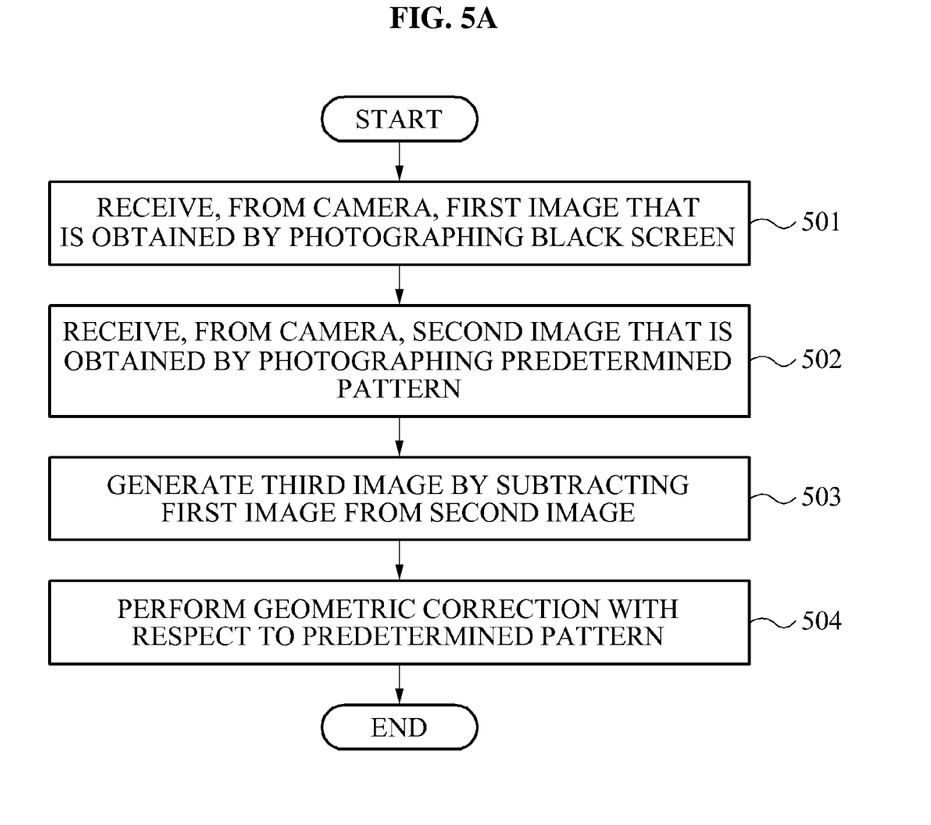
FIG. 5A is a flowchart illustrating a geometric correction method according to an embodiment of the present invention.
Figure 5B:
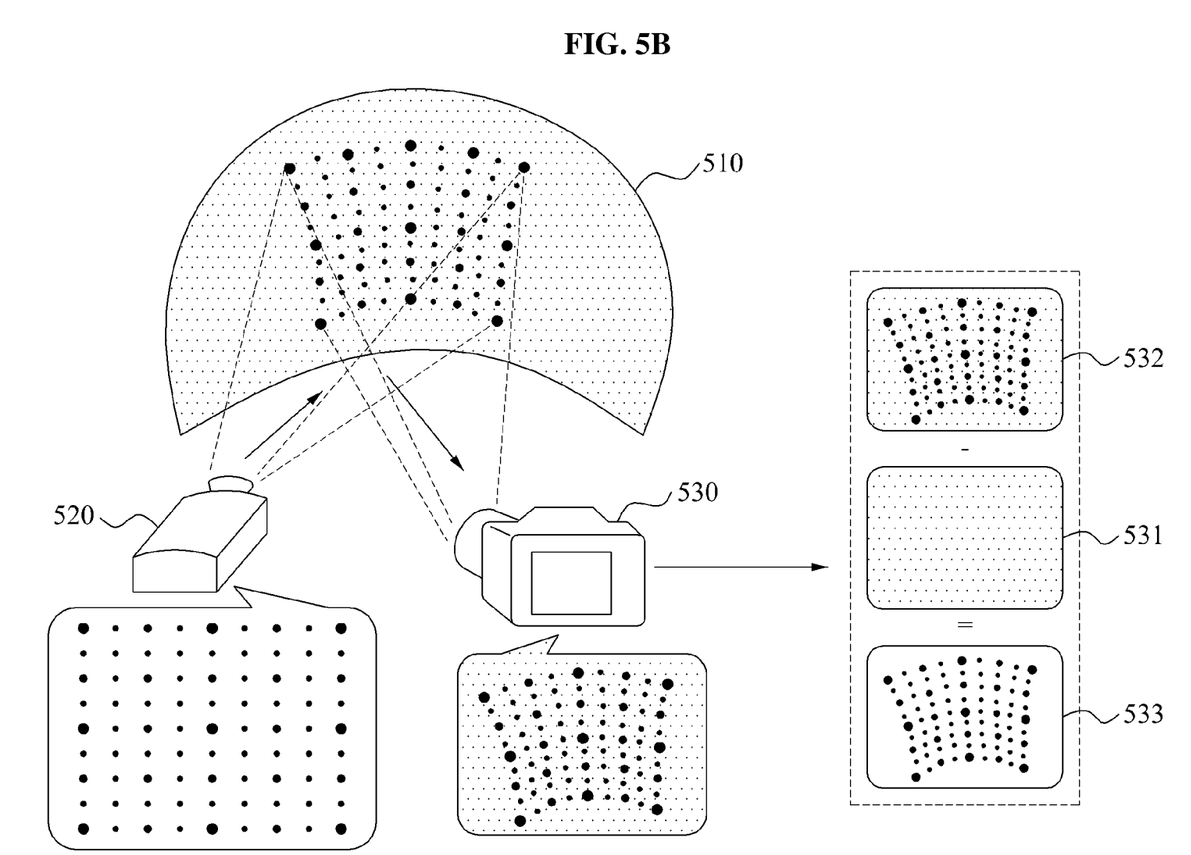
FIG. 5B is a diagram to describe an operation of receiving an image from a camera in a geometric correction method according to an embodiment of the present invention.

Hereinafter, an operation of a geometric correction method according to an embodiment of the present invention will be described with reference to FIGS. 5A and 5B.

A geometric correction method according to an embodiment of the present invention may be applicable to an offline calibration operation and an online rendering operation. Here, the geometric correction method may be applied once during the offline calibration operation and may be applied for every frame during the online rendering operation.

A camera 530 may photograph content that is projected onto a projection surface 510. The projection surface 510 may be an uneven quadric projection surface. Accordingly, when content of which geometric correction is not performed is projected onto the projection surface 510, the projected content may be distorted to be different from an original shape of the content. Accordingly, the geometric correction method may estimate the transformation occurring due to a pattern projected onto the surface, using a recursive Bezier patch sub-division.

A projector 520 may be randomly positioned in front of the projection surface 510 within a surface boundary area. Depending on embodiments, a plurality of projectors 520 may be provided as a multi-projector. For example, a geometric correction method according to an embodiment of the present invention may be applied alike even in a multi-projector environment.

The camera 530 may be positioned at a position at which all the areas of the projection surface 510 may be included.

As described above, when the camera 530 and the projector 520 are set, the projector 520 may project a black screen onto the projection surface 510. Here, the camera 530 may photograph the black screen that is projected by the projector 520 onto the projection surface 510, and may transmit, to a geometric correction apparatus, a first image 531 that is obtained by photographing the black screen. In operation 501, the geometric correction method may receive the first image 531 from the camera 530.

The first image 531 may be used to remove an environmental affect, a surface affect, and a camera affect. Here, for example, the environmental affect may include peripheral light coming from another light source and the like. Also, the surface affect may include a black dot on the projection surface 510 capable of causing a failure in detecting a feature point, and the like. Also, the camera affect may include a tone spread, a poor pixel, and the like.

When receiving of the first image 531 is completed, the projector 520 may project a predetermined pattern onto the projection surface 510. The predetermined pattern may be a rectangular grid including points. Here, the number of points that constitute the rectangular grid may be determined based on a level of a Bezier sub-division.

The camera 530 may photograph the predetermined pattern that is projected by the projector 520 onto the projection surface 510, and may transmit, to the geometric correction apparatus, a second image 532 that is obtained by photographing the predetermined pattern. In operation 502, the geometric correction method may receive the second image 532 from the camera 530.

When the first image 531 and the second image 532 are received from the camera 530, the geometric correction method may generate a third image 533 in which an undesired artifact is removed by subtracting the first image 531 from the second image 532 in operation 503.

In operation 504, the geometric correction method may perform the geometric correction with respect to the predetermined pattern in order to correct a distortion between the predetermined pattern and the third image 533.

Hereinafter, an operation of performing a geometric correction with respect to a predetermined pattern to correct a distortion in a geometric correction method according to an embodiment of the present invention will be further described with reference to FIG. 5.

Figure 6:
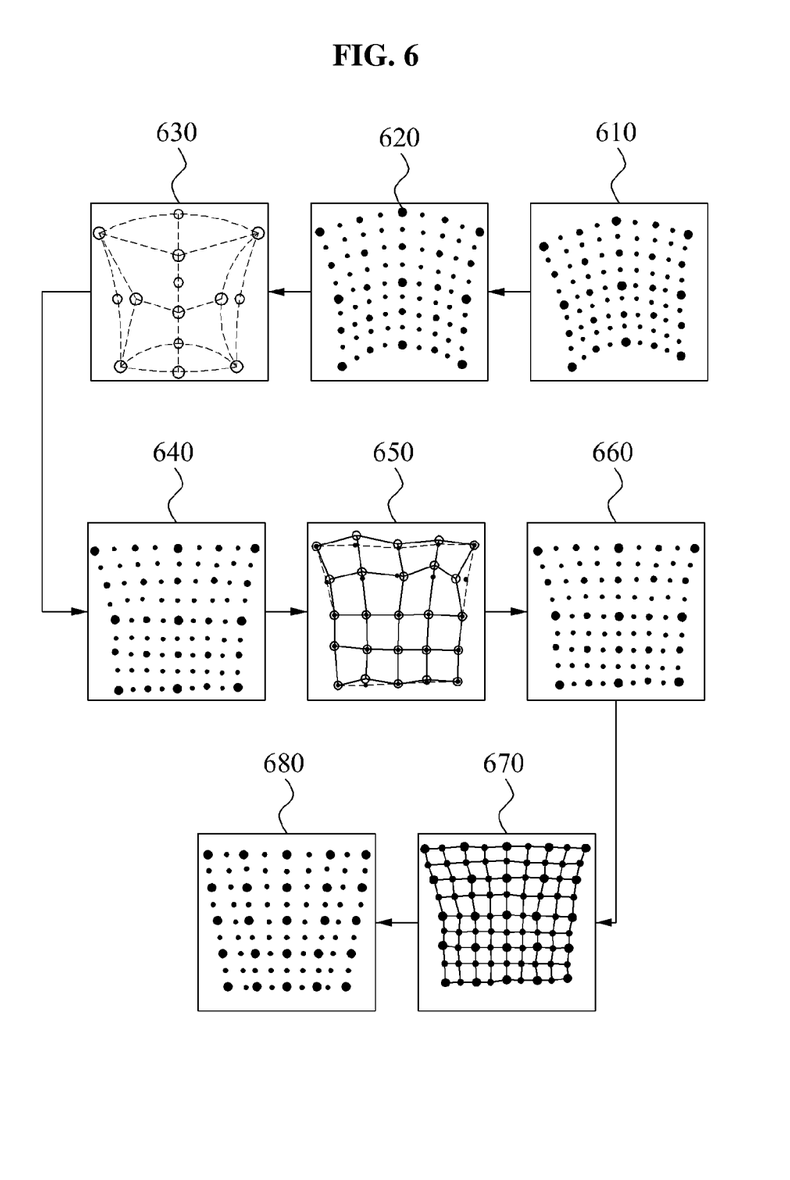
FIG. 6 is a diagram to describe an operation of performing geometric correction in a geometric correction method according to an embodiment of the present invention.

To perform the geometric correction, the geometric correction method may extract a feature point from a third image in operation 610. Depending on embodiments, the geometric correction method may extract a feature point using a Harris corner detection.

In operation 620, the geometric correction method may move the extracted feature point from a domain of the third image photographed using the camera to a domain of a predetermined pattern projected using a projector For example, the geometric correction method may relate the third image to the predetermined pattern that is projected using the projector. Since the distortion occurs between the predetermined pattern and the third image due to a shape of the projection surface, the geometric correction method may need to relate two images to each other.

For example, when the predetermined pattern that is projected by the projector is positioned at P(x, y) domain and the third image that photographed using the camera is positioned at C(x, y) domain, the geometric correction method may compute a homography in order to connect a third image on C(x, y) domain with the predetermined pattern on P(x, y) domain. Depending on embodiments, the geometric correction method may compute the homography by relating four corner feature points or Bezier control points of the third image to four corner points of the predetermined pattern.

When the homography is computed, the geometric correction method may move the extracted feature point from the domain of the third image to the domain of the predetermined pattern using the computed homography. That is, the geometric correction method may move all the feature points extracted from the third image, to the domain of the predetermined pattern, using the homography.

When all the feature points are moved, the geometric correction method may apply a Bezier transformation with respect to the third image based on the moved feature points. Also, the geometric correction method may perform the geometric correction by recursively applying the Bezier transformation.

To apply the Bezier transformation to the third image, the geometric correction method may set the entire third image to a single second order Bezier patch. Here, the second order Bezier patch may include four corner feature points that function as four corner control points.

In operation 630, the geometric correction method may compute a position of a control point with respect to the second order Bezier patch based on the moved feature points. Depending on embodiments, the geometric correction method may initially compute a position of a corner control point with respect to the second order Bezier patch and then compute a position of an edge control point and a position of a center control point based on the computed position of the control corner point.

When all the positions of control points are computed, the geometric correction method may apply Bezier transformation with respect to all the feature points within the second order Bezier patch in order to correct a distortion occurring due to the quadric surface in operation 640.

Also, in the case of a surface including a geometric distortion that is incapable of being corrected using a second degree Bezier approximation, the geometric correction method may sub-divide the second order Bezier patch into four sub-divisions. Here, each of the sub-divisions may include nine control points. Also, in operation 650, the geometric correction method may compute a position of a control point with respect to each sub-division. In operation 660, the geometric correction method may perform a geometric correction with respect to the predetermined pattern by applying the Bezier transformation with respect to all the feature points within each sub-division, and by recursively applying the Bezier transformation. Here, i-th level sub-patches generated by performing the sub-division operation an i number of times may be regarded as the independent quadric surface.

According to an aspect, the geometric correction method may recursively perform the sub-division operation with respect to a small portion of the projection surface in operations 670 and 680. Accordingly, a subdivision level may increase.

When the Bezier transformation is applied with respect to all the feature points within a sub-patch, the geometric correction method may apply the Bezier transformation in an inverse order of an order in which the sub-division operation is performed. For example, the geometric correction method may initially apply the Bezier transformation with respect to a sub-patch having a highest sub-division level and then sequentially apply the Bezier transformation in a descending order of a sub-division level.

According to an aspect, the geometric correction method may store information about a sub-patch in a lookup table while recursively applying the Bezier transformation. The stored lookup table may be used to execute a run-time application.

Figure 7:
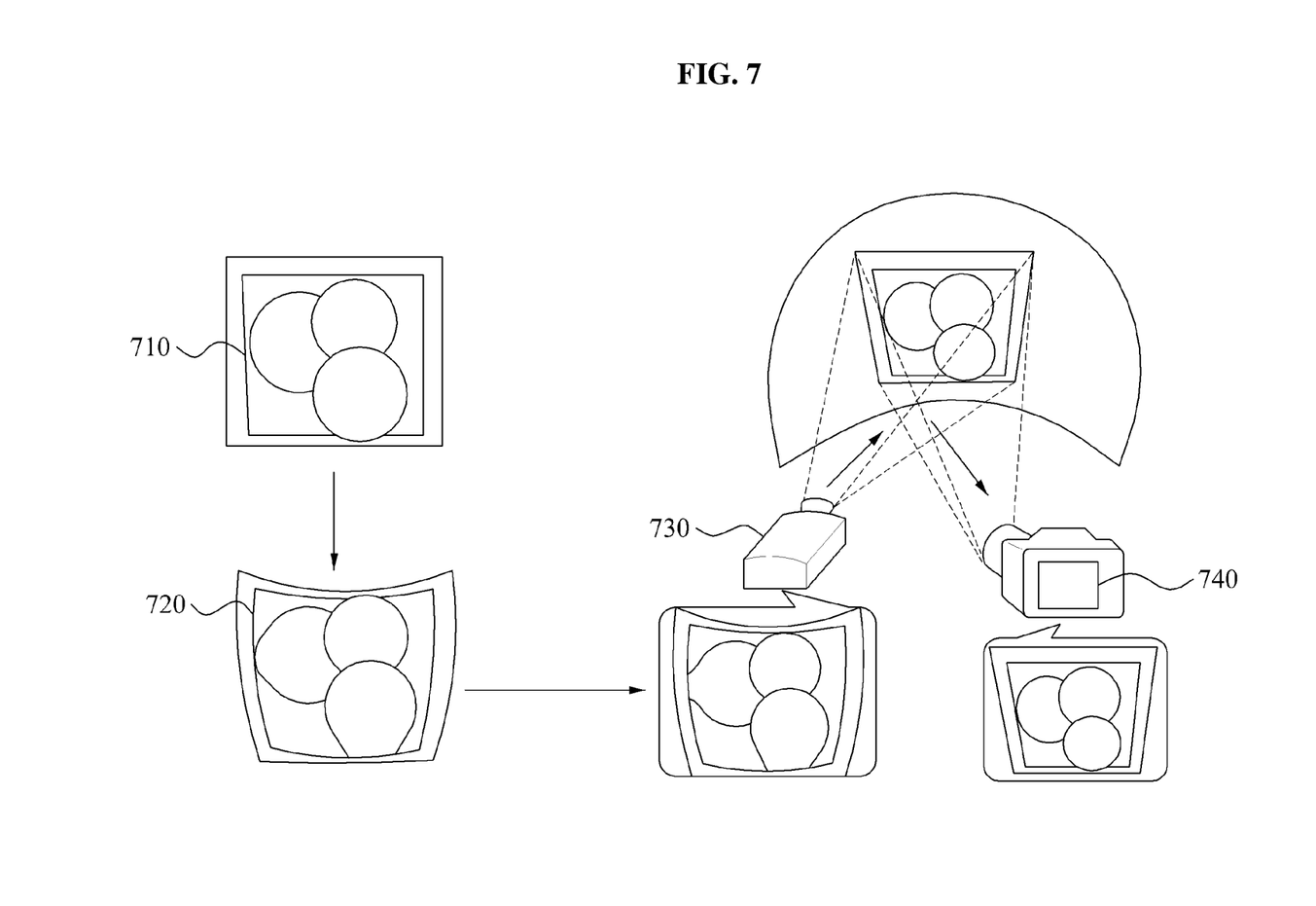
FIG. 7 is a diagram to describe an operation of executing a run-time application in a geometric correction method according to an embodiment of the present invention.

Referring to FIG. 7, the geometric correction method may execute a run-time application using an open graphics library (OpenGL) of warping each frame of content 710, based on the lookup table, so that the content 710 to be projected by a projector 730 onto a projection surface may be projected without being distorted on the projection surface. A frame 720 indicates a frame that is warped by applying the lookup table to prevent the distortion on the projection surface.

Figure 8:
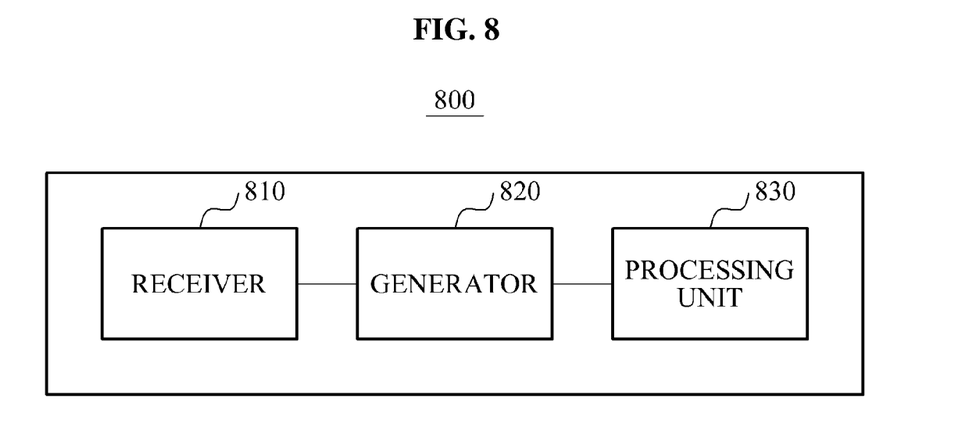
FIG. 8 is a block diagram illustrating a configuration of a geometric correction apparatus according to an embodiment of the present invention.

FIG. 8 is a block diagram illustrating a configuration of a geometric correction apparatus 800 according to an embodiment of the present invention.

Referring to FIG. 8, the geometric correction apparatus 800 may include a receiver 810, a generator 820, and a processing unit 830.

The receiver 810 may receive a first image from a camera.

The first image may be obtained by photographing a black screen and be used to remove an environmental affect, a surface affect, and a camera affect. Here, for example, the environmental affect may include peripheral light coming from another light source and the like. Also, the surface affect may include a black dot on the projection surface capable of causing a failure in detecting a feature point, and the like. Also, the camera affect may include a tone spread, a poor pixel, and the like.

When receiving of the first image is completed, a projector may project a predetermined pattern onto the projection surface. The predetermined pattern may be a rectangular grid including points. Here, the number of points that constitute the rectangular grid may be determined based on a level of a Bezier sub-division.

The camera may photograph the predetermined pattern that is projected by the projector onto the projection surface, and may transmit, to the geometric correction apparatus 800, a second image that is obtained by photographing the predetermined pattern. The receiver 810 may receive the second image from the camera.

When the first image and the second image are received from the camera, the generator 820 may generate a third image in which an undesired artifact is removed by subtracting the first image from the second image.

Also, the processing unit 830 may perform the geometric correction with respect to the predetermined pattern in order to correct a distortion between the predetermined pattern and the third image.

Hereinafter, an operation of performing, by the processing unit 830, a geometric correction with respect to a predetermined pattern to correct a distortion will be further described.

To perform the geometric correction, the processing unit 830 may extract a feature point from a third image. Depending on embodiments, the processing unit 830 may extract a feature point using a Harris corner detection.

Also, the processing unit 830 may move the extracted feature point from a domain of the third image photographed using the camera to a domain of a predetermined pattern projected using a projector For example, the processing unit 830 may relate the third image to the predetermined pattern that is projected using the projector. Since the distortion occurs between the predetermined pattern and the third image due to a shape of the projection surface, the processing unit 830 may need to relate two images to each other.

For example, when the predetermined pattern that is projected by the projector is positioned at P(x, y) domain and the third image photographed using the camera is positioned at C(x, y) domain, the processing unit 830 may compute a homography in order to connect a third image on C(x, y) domain with the predetermined pattern on P(x, y) domain. Depending on embodiments, the processing unit 830 may compute the homography by relating four corner feature points or Bezier control points of the third image to four corner points of the predetermined pattern.

When the homography is computed, the processing unit 830 may move the extracted feature point from the domain of the third image to the domain of the predetermined pattern using the computed homography. That is, the processing unit 830 may move all the feature points extracted from the third image, to the domain of the predetermined pattern, using the homography.

When all the feature points are moved, the processing unit 830 may apply a Bezier transformation with respect to the third image based on the moved feature points. Also, the processing unit 830 may perform the geometric correction by recursively applying the Bezier transformation.

To apply the Bezier transformation to the third image, the processing unit 830 may set the entire third image to a single second order Bezier patch. Here, the second order Bezier patch may include four corner feature points that function as four corner control points.

Also, the processing unit 830 may compute a position of a control point with respect to the second order Bezier patch based on the moved feature points. Depending on embodiments, the processing unit 830 may initially compute a position of a corner control point with respect to the second order Bezier patch and then compute a position of an edge control point and a position of a center control point based on the computed position of the control corner point.

When all the positions of control points are computed, the processing unit 830 may apply Bezier transformation with respect to all the feature points within the second order Bezier patch in order to correct a distortion occurring due to the quadric surface.

Also, in the case of a surface including a geometric distortion that is incapable of being corrected using a second degree Bezier approximation, the processing unit 830 may sub-divide the second order Bezier patch into four sub-divisions. Here, each of the sub-divisions may include nine control points. Also, the processing unit 830 may compute a position of a control point with respect to each sub-division. The processing unit 830 may perform a geometric correction with respect to the predetermined pattern by applying the Bezier transformation with respect to all the feature points within each sub-division, and by recursively applying the Bezier transformation. Here, i-th level sub-patches generated by performing the sub-division operation an i number of times may be regarded as the independent quadric surface.

According to an aspect, the processing unit 830 may recursively perform the sub-division operation with respect to a small portion of the projection surface. Accordingly, a subdivision level may increase.

When the Bezier transformation is applied with respect to all the feature points within a sub-patch, the processing unit 830 may apply the Bezier transformation in an inverse order of an order in which the sub-division operation is performed. For example, the processing unit 830 may initially apply the Bezier transformation with respect to a sub-patch having a highest sub-division level and then sequentially apply the Bezier transformation in a descending order of a sub-division level.

According to an aspect, the processing unit 830 may store information about a sub-patch in a lookup table while recursively applying the Bezier transformation. The stored lookup table may be used to execute a run-time application.

That is, the processing unit 830 may execute a run-time application using an OpenGL of warping each frame of content, based on the lookup table, so that content to be projected by a projector onto a projection surface may be projected without being distorted on the projection surface.

According to embodiments of the present invention, by photographing, using a camera, an image with respect to a predetermined pattern that is projected on an uneven projection surface, and by performing a Bezier transformation with respect to the photographed image, content to be projected onto the uneven projection surface may be projected to be in an undistorted original shape.

Also, according to embodiments of the present invention, it is possible to perform a geometric correction without performing camera calibration or extracting intrinsic or external parameters. Also, the geometric correction may be automatically performed even though a human being does not perform a predetermined operation in person to perform the geometric correction.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A geometric correction method, comprising:
receiving, from a camera, a first image that is obtained by photographing a black screen that is projected by a projector onto a projection surface;
receiving, from the camera, a second image that is obtained by photographing a predetermined pattern that is projected by the projector onto the projection screen;
generating a third image by subtracting the first image from the second image;
performing geometric correction with respect to the predetermined pattern to correct a distortion between the predetermined pattern and the third image;
wherein performing the geometric correction further comprises:
extracting a feature point from the third image,
moving the extracted feature point from a domain of the third image photographed using the camera to a domain of the predetermined pattern projected using the projector,
applying Bezier transformation with respect to the third image based on the moved feature point, and
performing the geometric correction by recursively applying the Bezier transformation,
wherein the applying further comprises:
setting the entire third image to a single second degree Bezier patch,
performing a sub-division operation of sub-dividing the second degree Bezier patch into four sub-patches,
computing a position of a control point with respect to each of the four sub-patches, and
applying the Bezier transformation with respect to all the feature points within each of the four sub-patches.

2. The method of claim 1, wherein the extracting comprises extracting the feature point using a Harris corner detection.

3. The method of claim 1, wherein the moving comprises:
computing a homography by relating four corner feature points of the third image to four corner points of the predetermined pattern; and
moving the extracted feature point from the domain of the third image to the domain of the predetermined pattern using the computed homography.

4. The method of claim 1, wherein the applying of the Bezier transformation with respect to all the feature points within each of the four sub-patches comprises applying the Bezier transformation in an inverse order of an order in which the sub-division operation is performed.

5. The method of claim 1, further comprising:
storing information about the sub-divisions in a lookup table.

6. The method of claim 1, further comprising:
executing a run-time application using an open graphics library (OpenGL) of warping each frame of content, based on the lookup table, so that the content is capable of being projected by the projector onto the projection surface without being distorted on the projection surface.

7. A geometric correction apparatus, comprising:
a receiver to receive, from a camera, a first image that is obtained by photographing a black screen that is projected by a projector onto a projection surface, and to receive, from the camera, a second image that is obtained by photographing a predetermined pattern that is projected by the projector onto the projection screen;
a generator to generate a third image in which an undesired artifact is removed by a subtracting the first image from the second image; and
a processing unit to perform geometric correction with respect to the predetermined pattern to correct a distortion between the predetermined pattern and the third image,
wherein the processing unit performs the geometric correction by being configured to extract a feature point from the third image, move the extracted feature point from a domain of the third image photographed using the camera to a domain of the predetermined pattern projected using the projector, apply Bezier transformation with respect to the third image based on the moved feature point, and perform the geometric correction by recursively applying the Bezier transformation, wherein the processing unit applies the Bezier transformation by being configured to set the entire third image to a single second degree Bezier patch, perform a sub-division operation of sub-dividing the second degree Bezier patch into four sub-patches, compute a position of a control point with respect to each of the four sub-patches, and apply the Bezier transformation with respect to all the feature points within each of the four sub-patches.

8. The geometric correction apparatus of claim 7, wherein the processing unit extracts the feature point by being configured to extract the feature point using a Harris corner detection.

9. The geometric correction apparatus of claim 7, wherein the processing unit moves the extracted feature point by being configured to compute a homography by relating four corner feature points of the third image to four corner points of the predetermined pattern, and to move the extracted feature point from the domain of the third image to the domain of the predetermined pattern using the computed homography.

10. The geometric correction apparatus of claim 7, wherein the processing unit applies the Bezier transformation by being configured to apply the Bezier transformation in an inverse order of an order in which the sub-division operation is performed.

11. The geometric correction apparatus of claim 7, wherein the processing unit stores information about the sub-divisions in a lookup table.

12. The geometric correction apparatus of claim 7, wherein the processing unit executes a run-time application using an open graphics library (OpenGL) of warping each frame of content, based on the lookup table, so that the content is capable of being projected by the projector onto the projection surface without being distorted on the projection surface.

* * * * *